United States Patent
Chang et al.

(10) Patent No.: US 6,871,984 B2
(45) Date of Patent: Mar. 29, 2005

(54) DISPLACEMENT AND TILT ADJUSTABLE APPARATUS

(75) Inventors: Fan-Chieh Chang, Hsin-Chu (TW); Kuo-Wen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 199 days.

(21) Appl. No.: 10/248,402

(22) Filed: Jan. 16, 2003

(65) Prior Publication Data

US 2003/0137848 A1 Jul. 24, 2003

(30) Foreign Application Priority Data

Jan. 18, 2002 (TW) ........................................ 91200729 U (51) Int. Cl.[7] ................................................. F21S 8/08
(52) U.S. Cl. ........................ 362/419; 362/418; 362/429; 108/23; 248/178.1
(58) Field of Search ................................. 362/428, 227, 362/249, 250, 257, 382, 269–271, 285–289, 418–421, 427; 108/1, 5, 23, 7–10, 137, 139, 140, 143; 248/178.1, 179.1, 184.1, 298.1, 271, 371; 356/138, 399

(56) References Cited

U.S. PATENT DOCUMENTS

| | | | | |
|---|---|---|---|---|
| 3,495,519 A | * | 2/1970 | Alfsen et al. | 108/143 |
| 3,603,545 A | * | 9/1971 | Boniface | 248/371 |
| 3,628,761 A | * | 12/1971 | Thomas, Jr. | 248/184.1 |
| 3,737,130 A | * | 6/1973 | Shiraishi | 248/181.1 |
| 3,829,978 A | * | 8/1974 | Basin et al. | 33/568 |
| 4,033,539 A | * | 7/1977 | Bardocz | 248/371 |
| 4,103,852 A | * | 8/1978 | Fisk | 248/176.1 |
| 4,365,779 A | * | 12/1982 | Bates et al. | 248/371 |
| 4,500,062 A | * | 2/1985 | Sandvik | 248/371 |
| 5,303,035 A | * | 4/1994 | Luecke et al. | 356/399 |
| 6,318,694 B1 | * | 11/2001 | Watanabe | 248/371 |
| 6,601,524 B2 | * | 8/2003 | Janata et al. | 108/143 |

* cited by examiner

Primary Examiner—John Anthony Ward
Assistant Examiner—Ismael Negron
(74) Attorney, Agent, or Firm—Winston Hsu (57) ABSTRACT

An adjusting apparatus for a light engine includes a base, a sliding seat, a carrier and at least one tilt-adjustig screw. The sliding seat includes at least a supporter, on which the sliding seat is instilled with an arc-shaped stand. The arc-shaped stand has a round surface and includes a slot installed on the round surface, and at least a fixing slot installed at a position adjacent to an end of the arc-shaped stand. The carrier includes a round surface corresponding to the round surface of the arc-shaped stand, a block passing through the slot and at least a fixing screw passing through the slot.

11 Claims, 7 Drawing Sheets

DISPLACEMENT AND TILT ADJUSTABLE APPARATUS

BACKGROUND OF THE INVENTION

1. Field of the Invention

The present invention relates to a projection device, and more particularly, to an adjusting apparatus for adjusting a light engine of the projection device.

2. Description of the Prior Art

In recent years, the dramatic development of electro-optical technologies has made data visualization a popular issue. The demand and importance for a projection device capable of displaying data have impressed the electronics industry. Therefore, projection device manufacturers make an effort to provide a projection device that produces high image quality.

Figure 1:
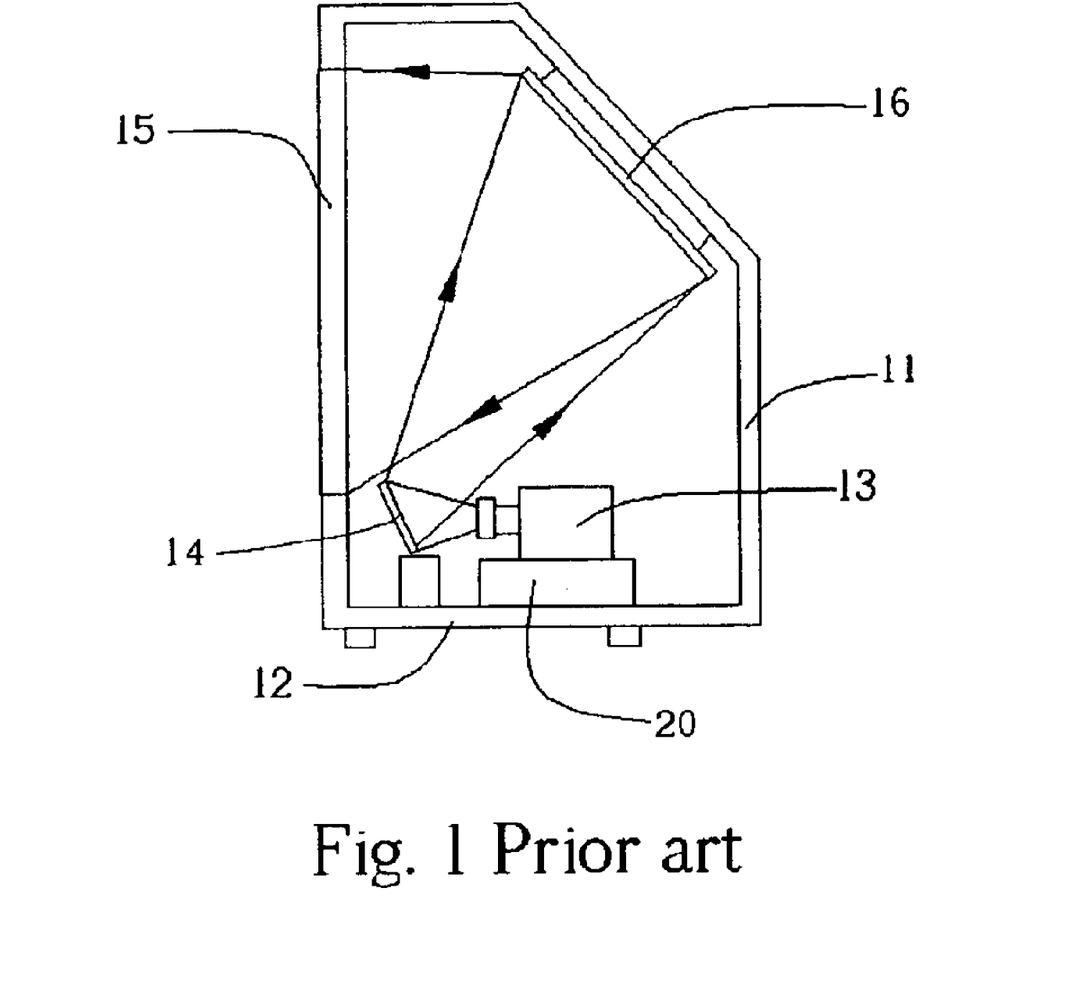
FIG. 1 is a schematic diagram of a rear projection television according to the prior art.

Please refer to FIG. 1, which is a schematic diagram of a rear projection television according to the prior art. The television comprises a housing 11, a base 12 installed inside the housing 11, an adjusting apparatus 20 installed on an upward surface of the base 12, and a light engine 13 installed on an upward surface of the adjusting apparatus 20. The light engine 13 emits light beams that contain image information onto a first mirror 14 that is installed at a position in front of the light engine 13. The rear projection television further comprises a second mirror 16 installed at a position inside of a screen 15, the position being on a light path the light emitted by the light engine 13 reflects from the first mirror 14 onto the second mirror 16. The second mirror 16 reflects the light beams reflected from the first mirror 14 onto the screen 15. The light engine 13, the first mirror 14, the second mirror 16, and the screen 15 constitute a projection system of the television. To guarantee that the images projected by the projection system of the television onto the screen 15 do not contain any aberrations or distortions, the light engine 13, the first mirror 14, the second mirror 16, and the screen 15 of the projection system must be precisely adjusted and delicately fabricated to reduce any potential errors.

Figure 2:
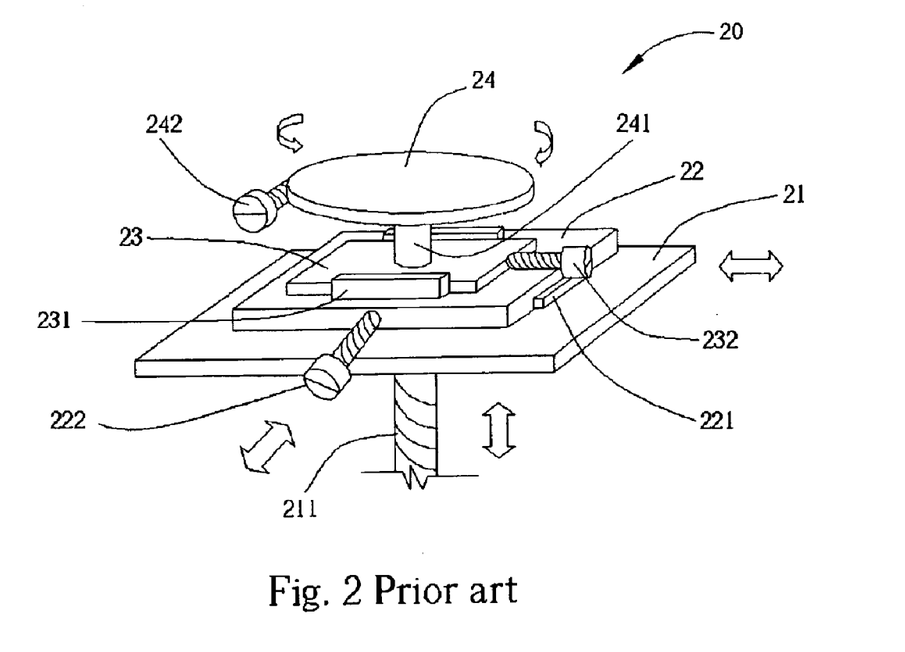
FIG. 2 is a schematic diagram of an adjusting according to the prior art.

Please refer to FIG. 2, which is a schematic diagram of the adjusting apparatus 20 according to the prior art. The adjusting apparatus 20 adjusts the path the light beams emitted by the light engine 13 travel with a direction-adjusting apparatus. A raising screw 211 is installed on a central region of a downward surface of a horizontally disposed raiser 21 for controlling vertical movement of the raiser 21. A first displacement plate 22 is installed on a central region of an upward surface of the raiser 21. Two limited blocks 221 (only one is shown) are repectively installed on the raiser 21 beside two opposite sides of the first displacement plate 22 for preventing the first displacement plate 22 from moving to the left or right. A forward-and-backward adjustment screw 222 is installed on a front side of the first displacement plate 22 for controlling forward and backward movement of the first displacement plate 22. Similarly, a second displacement plate 23 is installed on a central region of an upward surface of the first displacement plate 22. Two limited blocks 231 are respectively installed on two opposite sides of the second displacement plate 23 for preventing the second displacement plate 23 from moving forward and backward. A left-and-right adjustment screw 232 is installed on a right side of the second displacement plate 23 for controlling left and right movement of the second displacement plate 23. Finally, a rotatable plate 24 is installed on a central region of an upward surface of the second displacement plate 23. A holder 241 is used for supporting the rotatable plate 24. A screw 242 is installed on a side of the rotatable plate 24 and controls the rotational motion of the rotatable plate 24. Therefore, the light engine 13, which is installed on the adjusting apparatus 20, can emit the light beams onto a region in any direction.

However, the bulk of the pile-structured adjusting apparatus 20 is contradictory to the design beliefs for modern information products: light, thin, short, and small. Additionally, the adjusting apparatus 20 can only rotate the light engine 13 horizontally (around a normal line of each of the plates of the adjusting apparatus 20), rather than vertically.

SUMMARY OF THE INVENTION

It is therefore an objective of the claimed invention to provide a delicate and easy to use adjusting apparatus for optical engine to solve the drawbacks.

According to the claimed invention, the adjusting apparatus includes a base having an upward surface, a sliding seat installed on the upward surface of the base, a carrier, and at least one tilt-adjusting screw. The sliding seat has at least a supporter, on which is installed an arc-shaped stand. The arc-shaped stand has around surface, a slot installed on the round surface, and at least one fixing slot installed at a position adjacent to an end of the arc-shaped stand. The carrier is installed on the arc-shaped stand. A downward surface of the carrier has a round surface corresponding to the round surface of the arc-shaped stand, a block installed on the downward surface of the carrier and passing through the slot, and at least one fixing screw installed on a region adjacent to an end of the carrier and passing through the slot. The tilt-adjusting screw passes through the supporter for pressing against the block. A dovetail slot installed on a region along a central axis of an upward surface of the base, and a sliding plate fixed to the supporter, the sliding plate having a dovetail side corresponding to and capable of sliding along the dovetail slot. A fixing frame is installed on a central strip-shaped region along a central line of the downward surface of the base. A displacement adjusting screw is installed inside the fixing frame for moving forward or backward. These and other objectives of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

A preferred embodiment of the present invention will be explained with reference to the accompanying drawings.

Figure 3:
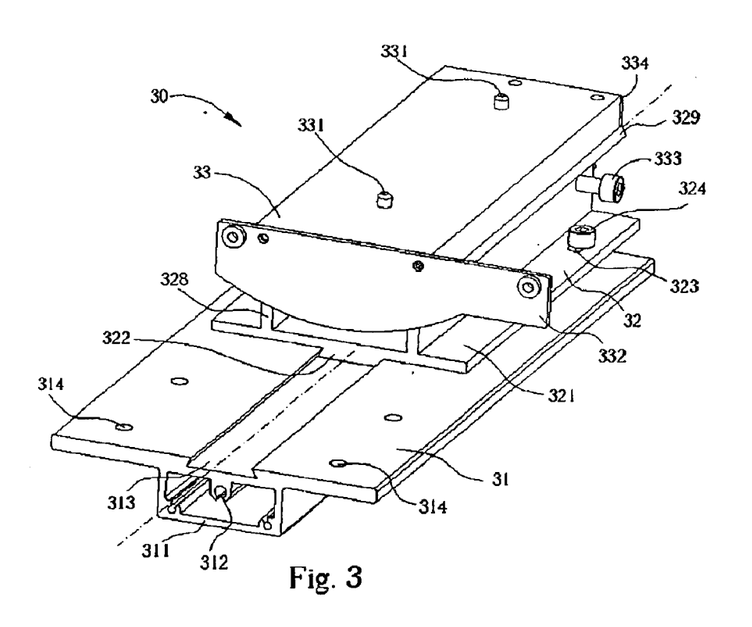
FIG. 3 is a front view of an adjusting apparatus according to the present invention.

Please refer to FIG. 3 the adjusting apparatus 30, used in light engine, comprises a base 31, a sliding seat 32 installed on a central region of an upward surface of the base 31, a carrier 33 installed on an upward surface of the sliding seat 32, and at least one fixing pin 331 installed on an upward surface of the carrier 33 for fixing a light engine (not shown) onto the carrier 33. A hollow frame 311 is installed on a region along a central line of a downward surface of the base 31. A fixing frame 312 is installed on a central strip-shaped region along a central line of the downward surface of the base 31 and inside the hollow frame 311. A dovetail slot 313 is installed on a region along a central line of the upward surface of the base 31. A plurality of fixing holes 314 are disposed in two rows respectively parallel to the central line of the upward surface of the base 31 and away from the central line by a predetermined distance. A sliding plate 321 is installed on a lower part of the sliding seat 32. A dovetail side 322 is installed on a region along a central line of a downward surface of the sliding plate 321, the dovetail side 322 corresponding to the dovetail slot 313. Two slots 323 (only one is shown), corresponding to the plurality of fixing holes 314, are installed on the sliding plate 321. Respectively passing through corresponding slots 323 and fixing holes 314, two positioning screws 324 (only one is shown) fix the sliding seat 32 onto the base 31.

Figure 4:
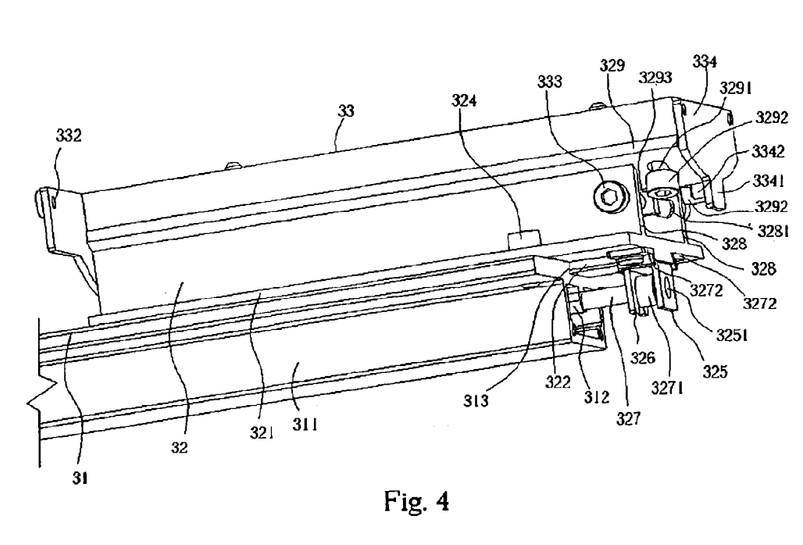
FIG. 4 is a back view of the adjusting apparatus shown in FIG. 3.

Please refer to FIG. 4, a first restricting plate 325 and a second restricting plate 326 are installed on two regions of the dovetail side 322 neighboring to a front end of the sliding plate 321, the first restricting plate 325 being disposed on a position away from the second restricting plate 326 by a predetermined distance. A hole 3251 is installed on a central region of the first restricting plate 325. A displacement-adjusting screw 327 is installed inside the fixing frame 312. A screw nut 3271 of the displacement-adjusting screw 327 is rotatably located on a position between the first restricting plate 325 and the second restricting plate 326. Two fixing plates 3272 are respectively installed on two sides of the dovetail side 322 and fix the first restricting plate 325 and second restricting plate 326 onto the downward surface of the sliding plate 321. Two supporters 328 are vertically installed on an upward surface of the sliding plate 321 for supporting an arc-shaped stand 329, part of the arc-shaped stand 329 protruding to a region outside of the sliding plate 321 to form a protruding part. Two fixing slots 3291 are respectively located on two sides of a downward surface of the protruding part of the arc-shaped stand 329. Two screw holes 3281 are respectively located on a side of each of the supporters 328 for two tilt-adjusting screw bolts 333 to pass through. Two lots 3293 are respectively installed on two regions of the arc-shaped stand 329 respectively corresponding to the tilt-adjusting screws 333.

Figure 5:
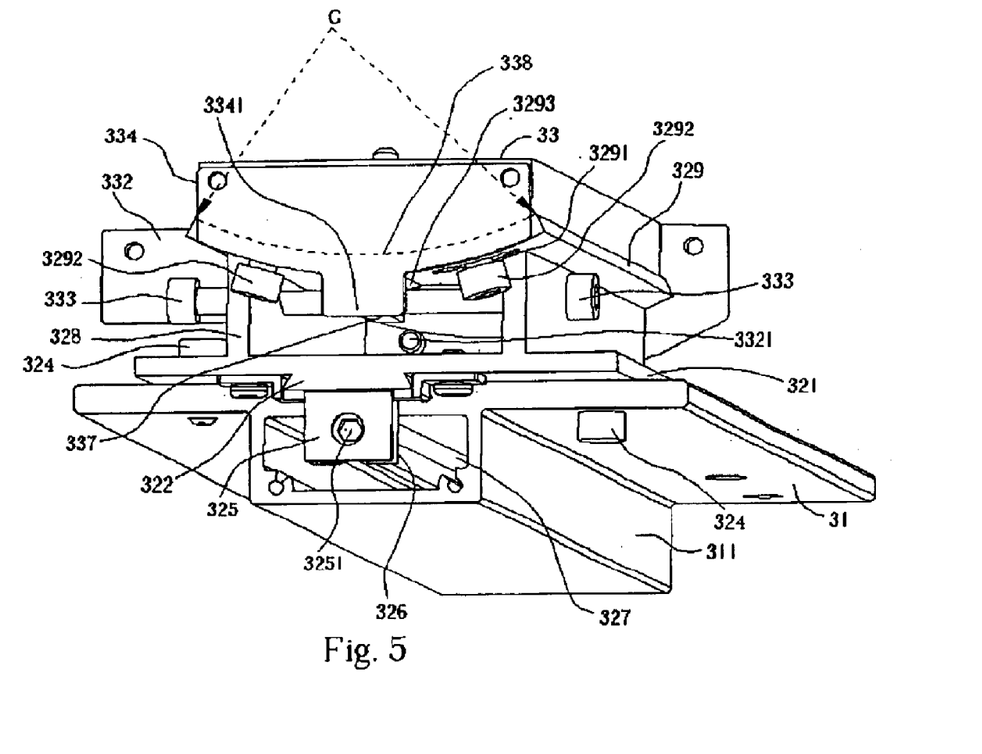
FIG. 5 is a bottom view of the adjusting apparatus shown in FIG. 3.

Please refer to FIG. 5, a round surface 338 being installed on a downward surface of the carrier 33. The round surface 338, which has a predetermined radius of curvature, of the carrier 33 enables the light engine 13 to slide back and forth along the round surface of the arc-shaped stand 329 according to an optical center G. A block 337 is downwardly installed on a region of the carrier 33 corresponding to the slots 3293 and protrudes through the slots 3293 and to the arc-shaped stand 329. The two tilt-adjusting screws 333 control the movement of the carrier 33 by pressing against the block 337. A back plate 334 is installed on a first end of the carrier 33 and a front plate 332 is installed on a second end of the carrier 33. Both the front plate 332 and the back plate 334 downwardly protrude to a region outside of the arc-shaped stand 329.

Figure 6:
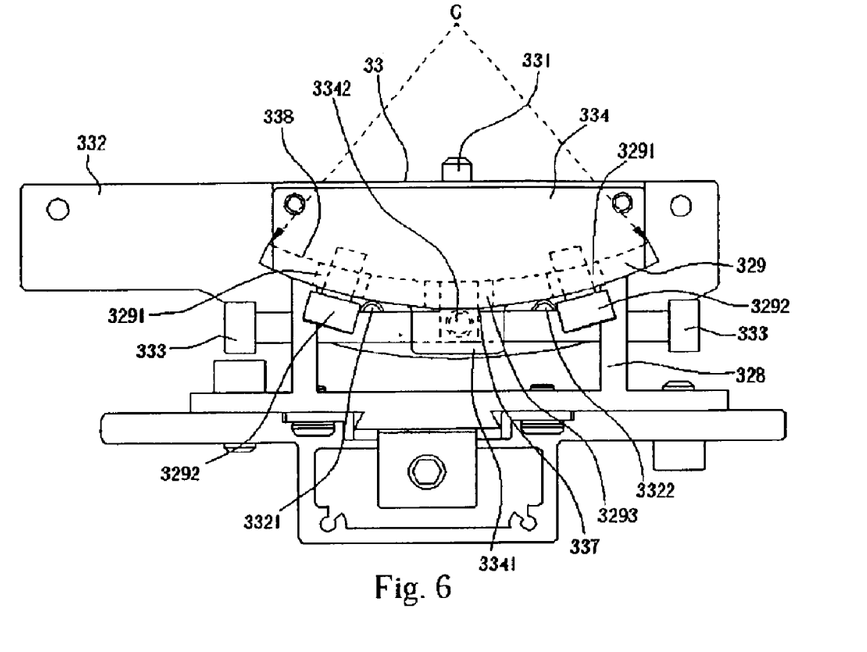
FIG. 6 is a cross section of the adjusting apparatus shown in FIG. 3.

Please refer to FIG. 6, two clip pins 3321, 3322 are respectively installed on two regions of an inner bottom side of the front plate 332 respectively adjacent to two sides of a downward surface of the arc-shaped stand 329. A clip pin 3342 is installed on an inner side of a protruding part 3341 on a bottom end of the back plate 334 adjacent to a central region on a bottom rim of the arc-shaped stand 329. The clip pins 3321, 3322, and 3342 are capable of clamping rims of the arc-shaped stand 329 so that the carrier 33 can only slide along the arc-shaped stand 329.

The operation of the adjusting apparatus 30 is described as follows. Fix the light engine onto the carrier 33 with the fixing pin 331. A screwdriver (not shown) passes through the hole 3251 and drives the screw nut 3271 of the displacement-adjusting screw 327 to move the sliding plate 321. Since the screw nut 3271 is confined to move between the first restricting plate 325 and the second restricting plate 326, the screw nut 3271 is driven according to the spinning motion of the screw nut 3271 against the first restricting plate 325. The sliding plate 321, which is fixed to the fist and second restriction plates 325 and 326 and driven by the displacement-adjusting screw 327, is forced to move forward or backward. Furthermore, the dovetail slot 313 of the base 31 confines the movement of the dovetail side 322. The sliding seat 32 can drive the carrier 33 and the light engine to move back and forth according to a central axis of the adjusting apparatus 30.

After the sliding seat 32 has been adjusted to stay at a certain position on the base 31, the positioning screws 324 respectively pass through the corresponding slot 323 and fixing holes 314 to fix the sliding seat 32 onto the base 31. The shape of the slot 323 can be designed to be long enough to allow the relative displacement between the sliding seat 32 and the base 31 to be finely tuned by only moving the displacement positioning screw 324 along the slot 323.

How the adjustig apparatus 30 adjusts the light engine to swing to the left and right along the arc-shaped stand 329 is described as follows. A fixing screw 3292 that is installed on a downward surface of the arc-shaped stand 329 is loosened such that the fixing screw 3292 is able to move along the fixing slot 3291 and the carrier 33 is able to slide along the round surface of the arc-shaped stand 329. Then the tilt-adjusting screw 333 is turned against two side surfaces of the block 337 to move the block 337 to left or to right and to drive the carrier 33 to slide along the round surface of the arc-shaped stand 329. Therefore, the light engine can only slide along a path around the optical center G, reducing the adjusting complexity for the light engine. Finally, the fixing screw 3292 is fastened to fix the carrier 33 onto the arc-shaped stand 329.

Figure 7:
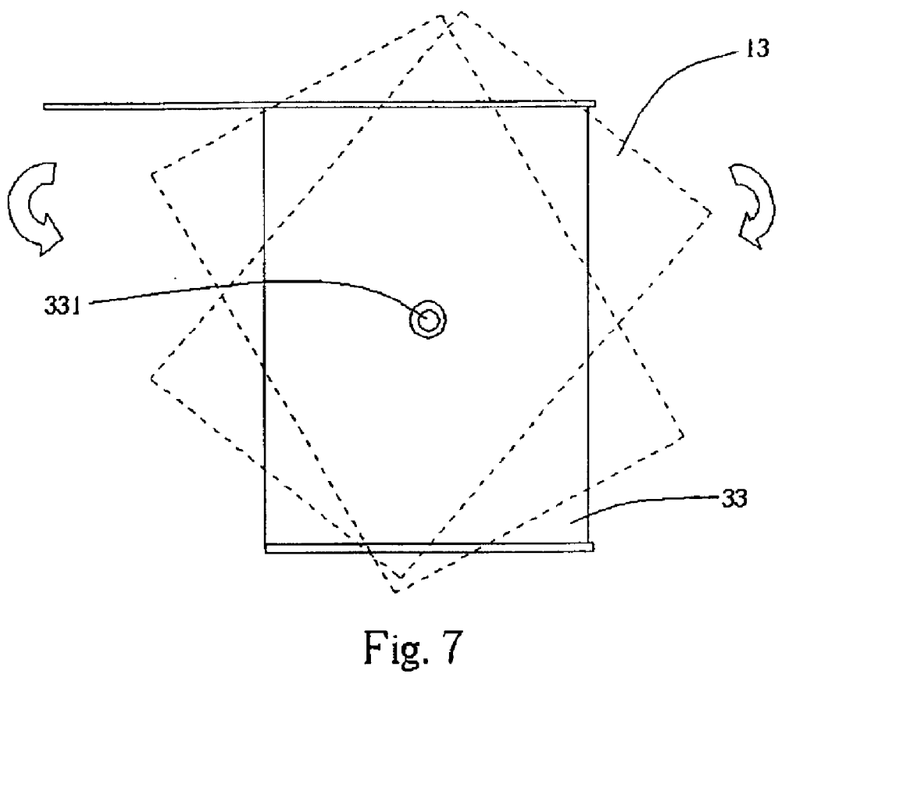
FIG. 7 is a schematic diagram of a carrier of a adjusting apparatus and a light engine according to the present invention.

Please refer to FIG. 7, the carrier 33 can comprise only one fixing pin 331, rather than at least one, and the light engine 13 can be adjusted according to the fixing pin 33.

For example, when the light engine 13 leans to a first side and part of the light engine 13 protrudes to a region outside of the carrier 33, the front plate 332 is able to support the protruding part of light engine 13 and the leaning light engine 13 forces the block 337 to push the tilt-adjusting screw 333 disposed close to the first side. Furthermore, an arc-shaped tooth-like strip (not shown) that is also adjusted by the tilt-adjusting screw 333, can replace the block 337 to control the swing movement of the light engine 13. Similarly, the horizontal movement adjustment of the light engine 13 can be realized by utilizing slots and corresponding screws while adjusting the adjusting apparatus 30.

In contrast to the prior art adjusting apparatus 20, the present invention can provide a light, thin, short, and small adjusting apparatus 30 to adjust the light engine 13, which is installed on the adjusting apparatus 30.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. An adjusting apparatus for light engine comprising:
  a base having an upward surface;
  a sliding seat installed on the upward surface of the base, the sliding seat having at least a supporter, on which is installed with an arc-shaped stand, the arc-shaped stand having a round surface, a slot installed on the round surface, and at least one fixing slot installed at a position adjacent to an end of the arc-shaped stand;
  a carrier installed on the arc-shaped stand, a downward surface of the carrier having a round surface corresponding to the round surface of the arc-shaped stand, a block installed on the downward surface of the carrier and passing through the slot, and at least one fixing screw installed on a region adjacent to a first end of the carrier and passing through the slot; and
  at least one tilt-adjusting screw passing through the supporter for controlling movement of the block.

2. The adjusting apparatus for light engine of claim 1 further comprising a back plate installed on a first end of the carrier neighboring to the fixing screw, a clip pin being installed on an inner side of a protruding part of the back plate neighboring to a lower rim of an end of the arc-shaped stand.

3. The adjusting apparatus for light engine of claim 1 further comprising at least a fixing pin installed on an upward surface of the carrier.

4. The adjusting apparatus for light engine of claim 1, wherein the block comprises an arc-shaped tooth-like strip mated with a tilt-adjusting screw.

5. The adjusting apparatus for light engine of claim 1, wherein a curvature center of the round surface of the arc-shaped stand coincides on an optical center of a light engine.

6. The adjusting apparatus for light engine of claim 1 further comprising a front plate installed on a second end of the carrier, a clip pin being installed on an inner side of a protruding part of the front plate neighboring to a lower rim of an end of the arc-shaped stand.

7. The adjusting apparatus for light engine of claim 6, wherein an end of the front plate protrudes to a region outside of the carrier.

8. The adjusting apparatus for light engine of claim 1 further comprising a dovetail slot installed on a region along a central axis of an upward surface of the base, and a sliding plate fixed to the supporter, the sliding plate having a dovetail side corresponding to and capable of sliding along the dovetail slot.

9. The adjusting apparatus for light engine of claim 8, wherein the sliding plate comprises a plurality of slots installed on two sides of the sliding plate for corresponding positioning screws to pass through, the slots being capable of fixing the sliding plate onto the base.

10. The adjusting apparatus for light engine of claim 8 further comprising a fixing frame installed on a region along a central axis on a downward surface of the base, a displacement-adjusting screw installed inside the fixing frame, a first restricting plate and a second restricting plate installed on a region of the dovetail side neighboring to the back plate, and a screw nut of the displacement-adjusting screw installed on a region between the first and second restricting plates.

11. The adjusting apparatus for light engine of claim 10, wherein a hole installed on a central region of the first restricting plate.

* * * * *